United States Patent [19]

Diaz

[11] Patent Number: 4,861,496
[45] Date of Patent: Aug. 29, 1989

[54] ELECTRO-DEWATERING METHOD AND APPARATUS

[75] Inventor: Manuel Diaz, El Monte, Calif.

[73] Assignee: Recycled Energy, Inc., Los Angeles, Calif.

[21] Appl. No.: 206,188

[22] Filed: Jun. 13, 1988

[51] Int. Cl.⁴ .................. B01D 17/06; B01D 35/06
[52] U.S. Cl. ......................... 210/748; 210/768; 210/783; 210/712; 210/713; 210/216; 210/243; 204/149; 204/152; 204/430; 204/1 R
[58] Field of Search ............... 210/712, 713, 748, 768, 210/783, 216, 243; 204/149, 152, 430, 1 W

[56] References Cited

U.S. PATENT DOCUMENTS

| | | | |
|---|---|---|---|
| 2,173,256 | 9/1939 | Jordan | 210/783 |
| 2,793,756 | 5/1957 | Haltmeier | 210/783 |
| 3,959,135 | 5/1976 | Shattock | 210/783 |
| 3,962,069 | 6/1976 | Inoue et al. | 210/748 |
| 4,043,047 | 8/1977 | Galliker | 210/748 |
| 4,101,400 | 7/1978 | Pepping | 210/729 |
| 4,179,347 | 12/1979 | Krause et al. | 210/748 |
| 4,290,882 | 9/1981 | Dempsey | 210/748 |
| 4,402,834 | 9/1983 | Bastgen et al. | 210/712 |
| 4,655,932 | 4/1987 | Roslonski | 210/748 |
| 4,671,874 | 6/1987 | Fremont et al. | 210/400 |
| 4,755,305 | 7/1988 | Fremont et al. | 210/748 |
| 4,772,398 | 9/1988 | Sando et al. | 210/783 |

FOREIGN PATENT DOCUMENTS

| | | | |
|---|---|---|---|
| 163549 | 10/1905 | Fed. Rep. of Germany | 210/748 |
| 52-8569 | 1/1977 | Japan | 210/243 |
| 55-157311 | 12/1980 | Japan | 210/243 |
| 57-59612 | 4/1982 | Japan | 210/748 |

Primary Examiner—Richard V. Fisher
Assistant Examiner—Cynthia L. Nessler
Attorney, Agent, or Firm—Drucker & Sommers

[57] ABSTRACT

An apparatus and method of electro-dewatering sewage sludge and other high water sludges. The sludge is passed through a conveyor means that is electrically charged. The anode has metal bristles or wires that protrude into the sludge mass. Water that migrates to the cathode is removed by conventional means. The dried sludge, which is attached to the bristles, is removed by vacuum means. About 30 percent of the sludge mass can be dewatered per pass.

11 Claims, 1 Drawing Sheet

U.S. Patent  Aug. 29, 1989  4,861,496
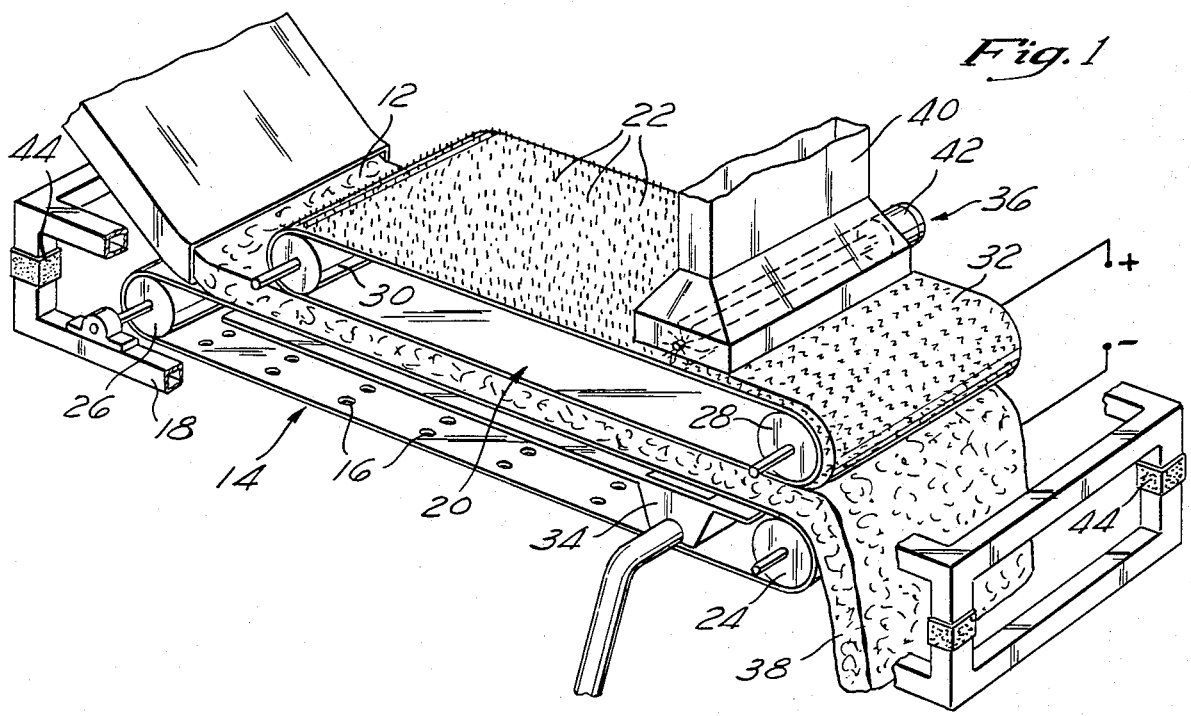
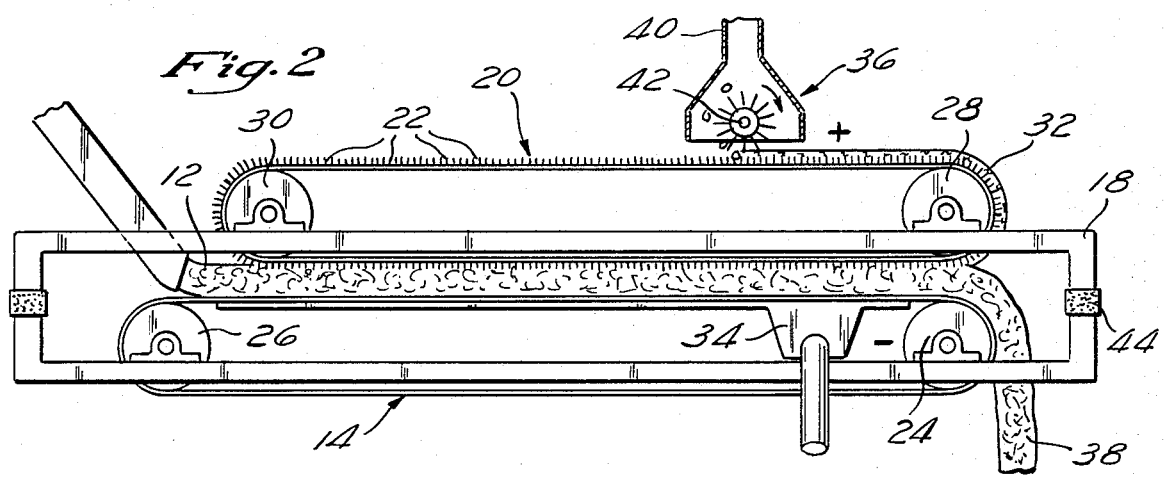
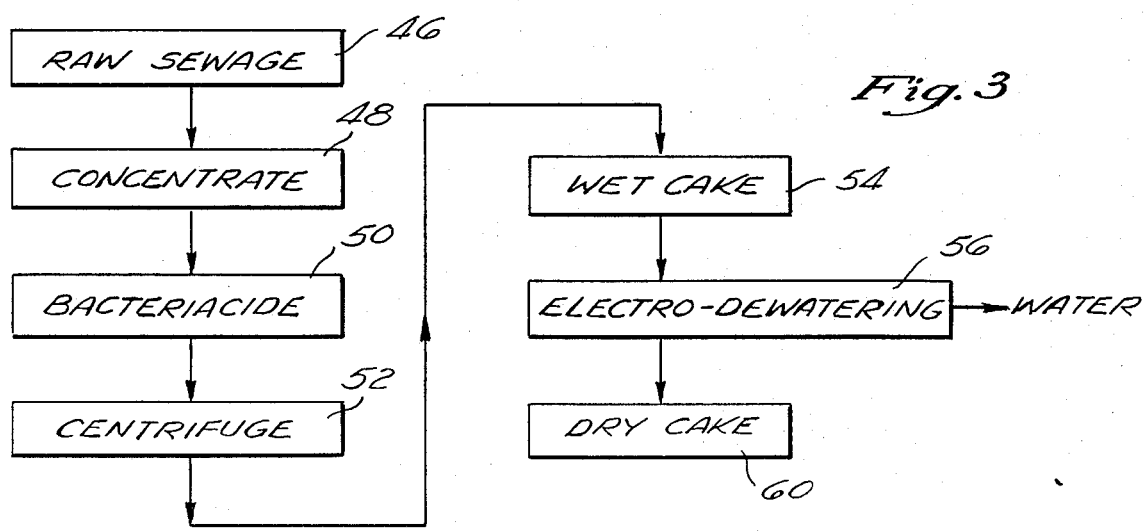

ELECTRO-DEWATERING METHOD AND APPARATUS

BACKGROUND OF THE INVENTION

This invention relates to methods for disposing of high-water sludge materials, particularly to methods of electrically dewatering sewage sludge.

A variety of methods have been developed for disposing of sewage. In particular, a variety of biodegrading schemes have been perfected. Most of these schemes produce, as a final product, a sludge which is refractory to further biodegradation. The sludge consists of inorganic matter, proteins, cellulosic material, hydrocarbons and the like. Disposal of this sludge is a major problem for large sewage treatment facilities that may generate up to 100 tons a day of sludge.

One of the problems with sludge is that although it may appear to be very viscous or nearly solid, it is about 80 percent by weight water. Therefore, it is virtually non-combustible.

One method for dewatering sludge is what is herein referred to as electro-dewatering. In this process and electric field is applied to a mass of sludge. This tends to free the water, presumably because the constituent molecules of the sludge move in response to the electric field.

Fremont in U.S. Pat. No. 4,671,874 discloses an electro-dewatering system using a chopped and time varied current. The conveyors shown are not electrified, but have electrodes behind them.

Roslonoski in U.S. Pat. No. 4,655,932 adds an electrolyte to the sludge to increase efficiency.

Bastegen in U.S. Pat. No. 4,402,834 teaches a conveyor which dewaters by vacuum, centrifugal, static pressure and pressure means.

Sneek in U.S. Pat. No. 4,101,400 teaches a pair of electrode conveyors inside a pair of motive conveyors.

SUMMARY OF THE INVENTION

This invention provides an apparatus and method for electro-dewatering sewage sludge and other types of sludges or solids containing high levels of water. The sludge is passed through a conveyor or means that is electrically charged. The anode has metal bristles or wires that protrude into the sludge mass. Water, which migrates to the cathode, is removed by conventional means. The dried sludge, which is attached to the bristles is removed by vacuum means.

An aspect of this invention is:

an apparatus for dewatering sludge comprising:

an endless cathode conveyor having a wet cake surface for receiving wet cake sludge material;

an endless anode conveyor disposed above said cathode conveyor and forming an interface of constant dimension therewith allowing metallic bristles disposed on the anode conveyor to contact said wet cake sludge material;

means for removing water from said wet cake sludge material disposed along said endless cathode conveyor;

first means for returning said endless anode conveyor and a second means for returning said endless cathode conveyor;

means for removing wet cake material; and vacuum means for removing dry cake from said metallic bristles.

A further aspect of this invention is:

a method of electromotively dewatering a sludge of wet cake comprising:

placing said wet cake on a conveyor cathode;

moving said wet cake through the interface between the conveyor anode and a conveyor cathode, said conveyor anode having electrically conductive means that engage said wet cake, said conveyor anode and conveyor cathode providing substantially constant direct current electric contact with said wet cake as it moves through said interface;

removing the water freed from said wet cake; and removing dry cake from said conveyor anode.

BRIEF DESCRIPTION OF THE DRAWINGS

FIG. 1 is a perspective view of the present invention.

FIG. 2 is a side view of the present invention.

FIG. 3 is a schematic block diagram showing the flow of sewage processing using the present invention.

DETAILED DESCRIPTION OF THE PREFERRED EMBODIMENT

Referring to FIGS. 1 and 2, "wet cake" sludge 12, as used herein, any sludge having at least 75 percent by weight water, is fed onto a first means for conveying 14. The sludge is supported on conveying means that is electrically conducting and has perforations 16 to allow liquid to flow away from the sludge mass. A supporting frame 18, supports a first conveyor means and a second conveyor means 20.

The sludge mass is sandwiched between the first means for conveying and a second means for conveying. The second means for conveying includes electrically conducting means. A preferred means is a plurality of bristles 22 or spikes projecting away from a support member and into the sludge mass. The bristles or spikes can be any metal. Iron is the preferred metal.

The endless cathode extends between a first support 24 and a second support 26 preferably the endless anode extends between a third support 28 and a fourth support 30.

The first means for conveying is cathodic relative to the second means for conveying. Conventional experience has shown that water will tend to be attracted to the cathode leaving relatively drier sludge 32 contacting the second conveying means.

Under the first conveying means is a water receiver 34 for water released from the electrode watering process.

The sludge contacting the anode that is dried is herein referred to as "dry cake" 32, a solid having no more than about 30% by weight water. The dry cake is conveyed to the top of the second means for conveying where it contacts a dry cake remover 36. The wet cake that is not dried, about 70 percent to 80 percent of the original amount of wet cake, is recycled (38).

The dry cake is removed from the bristles of the endless anode by a means suitable for such removal. The preferred means for dry cake removal is vacuum means 40. It is especially preferred to have a rotatable brush 42 dislodge the dry cake so that it may be removed by the vacuum means.

It is essential that the only electric conducting path between the first means for conveying and the second means for conveying be through the mass of wet cake. Therefore, care must be taken to prevent the possibility of conducting through, for example, the supporting frame. This is done through the use of non conducting joining means, for example, ceramic dividers 44.

Referring to FIG. 3, a system for treating raw sewage is shown. Raw sewage 46 is fed into a sewage processing plant. Raw sewage is primarily water with organic solids suspended in it. The sewage is allowed to concentrate 48 in large concentrating tanks, which allow most of the non-dissolved solids to settle out of the solution, thereby producing a semi-solid product that has greatly increased solid concentration.

The solid is then treated with a bactericide 50 to remove pathogenic and other undesirable bacteria. The mass of solids is then subjected to centrifugation 52 to remove excess water. The resultant mass is herein referred to as "wetcake" 54, a complex of about 20 percent by weight insoluble complex organic molecules, large chain fatty acids, protein, cellular debris, undigested cellulosic material, hydrocarbons, and the like, and about 80 percent by weight water.

The wet cake is then electro-dewatered (56) by means of the apparatus of this invention. Dry cake 60 produced by the electrode watering process and apparatus of this invention is dry enough to be burned as fuel. It is briquetted after removal from the dewatering apparatus. It can then be used as a fuel source for boilers, thereby producing power, or other heat utilizing systems.

The fine bristles on the second conveying means effectively transport the charge to within the mass of the wet cake being transported on the first conveying means. The bristles will slowly corrode with time; therefore, they are in periodic need of replacement. It is preferred that the bristles be mounted on panels of electrically conducting backing or mounting that is removably fastened to the second means for conveying. It is preferred that the mounting be flexible, so that few panels need to be replaced to entirely replace the surface of the second means for conveying.

It has been observed that, in an apparatus of the type described which has a first means for conveying surface of 2×10 feet and a speed of 2.5 feet/minute, and that when a potential of 48 volts is established between the first means for conveying and the second means for conveying, approximately 150 cubic feet of water are removed.

I claim:

1. A method of electromotively dewatering wet cake sludge comprising:
    (a) placing wet cake on a conveyor cathode;
    (b) moving said wet cake through an interface between the conveyor cathode and a conveyor anode, said conveyor cathode having electrically conductive means that engage said wet cake, said conveyor anode having electrically conducting metallic bristles;
    the metallic bristles contacting the wet cake for substantially the same distance as the conveyor cathode; and said cathodes being substantially electrically insulated from said anode thereby providing substantially constant direct current electric contact through said wet cake;
    (c) removing water freed from said wet cake; and
    (d) removing dry cake from said conveyor anode.
2. The method of claim 1, including the step:
    (e) recycling the undried wet cake.
3. The method of claim 1, including the step of using a direct current electric field having a constant potential of 48 volts between said anode and said cathode.
4. The method of claim 1, including transporting the dry cake to a vacuum dry cake removal means.
5. The method of claim 1, including agitating the dry cake with a brush.
6. The method of claim 4, wherein said dry cake is subsequently briquetted.
7. The method of claim 1, including as a final step the combustion of the dry cake for use as a fuel source.
8. An apparatus for dewatering sewage sludge comprising:
    an endless cathode conveyor having a wet cake support surface for receiving wet cake sludge material;
    an endless anode conveyor disposed above said cathode conveyor and forming an interface of constant dimension therewith allowing anodic metallic bristles disposed on the endless anode conveyor to contact said wet cake;
    means for substantially electrically insulating the endless cathode from the endless anode;
    means for removing water disposed along said endless cathode conveyor;
    first means for returning said endless cathode conveyor and a second means for returning said endless anode conveyor;
    means for removing undried wet cake; and
    means for removing dry cake form said metallic bristles.
9. The apparatus of claim 8, wherein said means for removing water are perforations in the wet cake support surface.
10. The apparatus of claim 8, wherein said means for removing said dry cake is a vacuum means.
11. The apparatus of claim 10, wherein said vacuum means includes a brush to dislodge the dry cake.

* * * * *